Patented Jan. 27, 1953

2,626,913

UNITED STATES PATENT OFFICE 2,626,913

PROCESS FOR BREAKING PETROLEUM EMULSIONS

Melvin De Groote, University City, Mo., assignor to Petrolite Corporation, a corporation of Delaware No Drawing. Application December 1, 1950, Serial No. 198,755

11 Claims. (Cl. 252—341)

This invention relates to petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

One object of my invention is to provide a novel process for breaking or resolving emulsions of the kind referred to.

Another object of my invention is to provide an economical and rapid process for separating emulsions which have been prepared under controlled conditions from mineral oil, such as crude oil and relatively soft waters or weak brines. Controlled emulsification and subsequent demulsification under the conditions just mentioned, are of significant value in removing impurities particularly inorganic salts from pipeline oil.

Demulsification as contemplated in the present application includes the preventive step of commingling the demulsifier with the aqueous component which would or might subsequently become either phase of the emulsion, in absence of such precautionary measure. Similarly, such demulsifier may be mixed with the hydrocarbon component.

The demulsifying agent employed in the present process is a fractional ester obtained from a polycarboxy acid and a diol, obtained by the oxypropylation of a low molal amide such as acetamide, propionamide, etc. The amides are characterized by freedom from any group having 8 or more uninterrupted carbon atoms in a single radical. In addition to the other amides previously noted there are other suitable reactants such as butyramide, valeramide and benzamide. Other amides include those derived from cyclohexanoic acid, phenoxypropionic acid, furoic acid, tetrahydrofuroic acid, methoxypropionic acid, etc.

For all practical purposes the amide most readily available commercially at a low cost is acetamide. The dihydroxylated compound obtained by oxypropylation of acetamide, assuming that both amine hydrogens are susceptible to oxypropylation, must be water-insoluble and kerosene-soluble.

Ignoring certain variants of structure which will be considered subsequently and also the fact that at least in part acetamide might be susceptible to oxypropylation in regard to one amino hydrogen only, the demulsifier may be exemplified by the following formula:

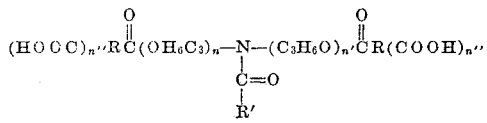

in which R'CO is the acyl radical of a monocarboxy acid having less than 8 carbon atoms in any single group; and $n$ and $n'$ are whole numbers with the proviso that $n$ plus $n'$ equals a sum varying from 15 to 80; $n''$ is a whole number not over 2 and R is the radical of the polycarboxy acid

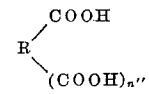

preferably free from any radicals having more than 8 uninterrupted carbon atoms in a single group, and with the further proviso that the parent dihydroxy compound prior to esterification be water-insoluble and kerosene-soluble.

Oxypropylation of acetamide, for example, presents certain abnormal values which are not susceptible to complete or even partial explanation. The facts are that the relationship in some instances between the theoretical molecular weight of the hydroxylated derivatives and the hydroxyl value molecular weight shows variation other than one would expect.

As far as acylamides themselves are concerned it is well known that tautomerism takes place as shown by the following:

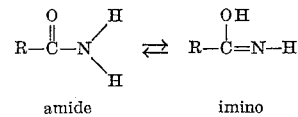

amide        imino

Owing to the presence of active hydrogens in amides, these compounds react with metals to form salts. For example, acetamide reacts with metallic sodium to yield a sodium salt. The greatest difficulty results in attempting to arrive at a possible structure of this salt; it may be either one of the following:

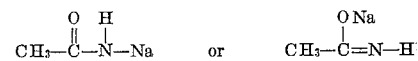

What has been said previously in regard to the materials herein described and particularly for use as demulsifiers with reference to fractional esters, may be and probably is an over-simplification for reasons which are obvious on further examination. The assumption has been and it is believed to be largely true that the oxypropylation of a sulfonamide produces a dihydroxylated compound. There is some evidence based on abnormal molecular weights that at least in part under certain conditions one does not necessarily obtain a hundred per cent dihydroxylated compound but one may obtain a monohydroxylated compound due to the fact only one amido hydrogen is attacked by the alkylene oxide and this would be true whether it happened to be propylene oxide or some other oxide, such as ethylene oxide.

Since oxypropylations are conducted in presence of caustic soda or an equivalent catalyst, such as sodium methylate, in the substantial absence of water there is a question as to whether or not some sort of structural change may be involved or perhaps some other type of reaction involving an alpha hydrogen atom attached to the carbon atom which, in turn, is joined to the carbonyl carbon atom.

If this is the case it is purely a matter of speculation at the moment because apparently there is no data which determines the matter completely under all conditions of manufacture and one has a situation somewhat comparable to the acylation of monoethanolamine or diethanolamine, i. e., acylation can take place involving either the hydrogen atom attached to oxygen or the hydrogen atom attached to nitrogen.

However, as far as the herein described compounds are concerned it would be absolutely immaterial except that one would have in part a compound which might be a fractional ester and might also have an amide structure with only one carboxyl radical of the polycarboxylated reactant involved. It would be comparable to obtaining a dibasic compound by reacting one mole of ethylethanolamine with two moles of phthalic anhydride to produce an acidic ester amide.

By and large it is believed the materials obtained are fractional esters obtained from dihydroxylated compounds as hereinafter stated in greater detail.

Attention is directed to the co-pending application of C. M. Blair, Jr., Serial No. 70,811, filed January 13, 1949 (now Patent 2,562,878, granted August 7, 1951), in which there is described, among other things, a process for breaking petroleum emulsions of the water-in-oil type characterized by subjecting the emulsion to the action of an esterification product of a dicarboxylic acid and a polyalkylene glycol in which the ratio of equivalents of polybasic acid to equivalents of polyalkylene glycol is in the range of 0.5 to 2.0, in which the alkylene group has 2 to 3 carbon atoms, and in which the molecular weight of the product is between 1,500 to 4,000.

Similarly, there have been used esters of dicarboxy acids and polypropylene glycols in which 2 moles of the dicarboxy acid ester have been reacted with one mole of a polypropylene glycol having a molecular weight, for example, of 2,000 so as to form an acidic fractional ester. Subsequent examination of what is said herein in comparison with the previous example as well as the hereto appended claims will show the line of delineation between such somewhat comparable compounds. Of greater significance, however, is what is said subsequently in regard to the structure of the parent diol as compared to polypropylene glycols whose molecular weights may vary from 1,000 to 2,000.

As previously stated one preferably uses acetamide due to its ready availability in commercial or technical grades. It is obvious also that one could react amides of the kind described with a few moles, for instance, one to 4 moles, of some other alkylene oxide such as ethylene oxide or butylene oxide or a mixture of the two oxides. The oxyalkylated derivatives so obtained could then be oxypropylated so as to yield an intermediate having the same properties previously described, i. e., water-insolubility and xylene-solubility, and being within the molecular weight range roughly of 1,000 to 8,000, and preferably within the range where the product shows kerosene-solubility, which means in a general way from 3,000 upward. The values just referred to are the theoretical molecular weight values based on the assumption that completeness of reaction takes place. Subsequent reference will be made to the comparison between the hydroxyl molecular weights and the theoretical molecular weights.

I have found no advantage in subjecting the amide to reaction with ethylene oxide or butylene oxide prior to oxypropylation. For this particular reason subsequent examples will be concerned with derivatives of acetamide insofar that even this requires a presentation of considerable data.

Obviously a suitable amide, such as acetamide, could be treated with compounds which would yield derivatives having both a hydroxyl radical and a side chain ether as well as, for example, reactions involving acetamide on the one hand and allyl glycidyl ether, glycidyl isopropyl ether, glycidyl phenyl ether, or the like, on the other hand. Such compounds could, of course, be treated with a mole or more of ethylene oxide before reacting with propylene oxide to produce the oxypropylated derivatives described subsequently in greater detail.

It will be noted that another type of amide having 2 terminal hydroxyls can be employed to make compounds comparable to those described herein, both at the end of the oxypropylation stage and at the end of the esterification stage. These particular compounds are effective also for demulsification and for various other purposes herein described. Such compounds are obtained from a substituted amine free from a hydroxylated radical. In other words, instead of being amides derived from ammonia, ethanolamine, or diethanolamine, they are amides derived from propylamine, butylamine, amylamine, cyclohexylamine, benzylamine, aniline, and the like. The amides thus obtained are comparable to those previously described with this exception; a hydrocarbon radical having less than 8 carbon atoms replaces one of the amido hydrogen atoms and thus there is only one amido hydrogen atom available for reaction with propylene oxide if such reaction were conducted without an intermediate step. However, such compound can be converted into a dihydroxylated compound by reaction with glycide or, if desired, by first reacting with ethylene oxide and then with glycide.

For convenience, what is said hereinafter will be divided into five parts:

Part 1 is concerned with the preparation of the oxypropylation derivatives of the specified amides;

Part 2 is concerned with the preparation of the esters from the oxypropylated derivatives;

Part 3 is concerned with the structure of the oxypropylation products obtained from the specified amides derived from monocarboxy acid;

Part 4 is concerned with the use of the products herein described as demulsifiers for breaking water-in-oil emulsions; and Part 5 is concerned with certain derivatives which can be obtained from the oxypropylated amides. In some instances such derivatives are obtained by modest oxyethylation preceding the oxypropylation step, or oxypropylation followed by oxyethylation. This results in diols having somewhat different properties which can then be reacted with the same polycarboxy acids or anhydrides described in Part 2 to give effective demulsifying agents. For this reason a description of the apparatus makes casual mention of oxyethylation. For the same reason there is brief mention of the use of glycide.

PART 1

For a number of well known reasons equipment, whether laboratory size, semi-pilot plant size, pilot plant size, or large scale size, is not as a rule designed for a particular alkylene oxide. Invariably and inevitably, however, or particularly in the case of laboratory equipment and pilot plant size the design is such as to use any of the customarily available alkylene oxides, i. e., ethylene oxide, propylene oxide, butylene oxide, glycide, epichlorohydrin, styrene oxide, etc. In the subsequent description of the equipment it becomes obvious that it is adapted for oxyethylation as well as oxypropylation.

Oxypropylations are conducted under a wide variety of conditions, not only in regard to presence or absence of catalyst, and the kind of catalyst, but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximating the boiling point of water or slightly above, as for example 95° to 120° C. Under such circumstances the pressure will be less than 30 pounds per square inch unless some special procedure is employed as is sometimes the case, to wit, keeping an atmosphere of inert gas such as nitrogen in the vessel during the reaction. Such low-temperature-low reaction rate oxypropylations have been described very completely in U. S. Patent No. 2,448,664, to H. R. Fife, et al., dated September 7, 1948. Low temperature, low pressure oxypropylations are particularly desirable where the compound being subjected to oxypropylation contains one, two or three points of reaction only, such as monohydric alcohols, glycols and triols.

Although the word "glycol" or "diol" is usually applied to compounds containing carbon, hydrogen, and oxygen only, yet the nitrogen-containing compounds herein are diols in the sense that they are dihydroxylated. Thus, the conditions which apply to the oxypropylation of certain glycols also apply in this instance.

Since low pressure-low temperature-low reaction speed oxypropylations require considerable time, for instance, 1 to 7 days of 24 hours each to complete the reaction they are conducted as a rule whether on a laboratory scale, pilot plant scale, or large scale, so as to operate automatically. The prior figure of seven days applies especially to large-scale operations. I have used conventional equipment with two added automatic features; (a) a solenoid controlled valve which shuts off the propylene oxide in event that the temperature gets outside a predetermined and set range, for instance, 95° to 120° C., and (b) another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose where the pressure of reaction is higher, speed of reaction is higher, and time of reaction is much shorter. In such instances such automatic controls are not necessarily used.

Thus, in preparing the various examples I have found it particularly advantageous to use laboratory equipment or pilot plant which is designed to permit continuous oxyalkylation whether it be oxypropylation or oxyethylation. With certain obvious changes the equipment can be used also to permit oxyalkylation involving the use of glycide where no pressure is involved except the vapor pressure of a solvent, if any, which may have been used as a diluent.

As previously pointed out the method of using propylene oxide is the same as ethylene oxide. This point is emphasized only for the reason that the apparatus is so designed and constructed as to use either oxide.

The oxypropylation procedure employed in the preparation of the oxyalkylated derivatives has been uniformly the same, particularly in light of the fact that a continuous automatically-controlled procedure was employed. In this procedure the autoclave was a conventional autoclave made of stainless steel and having a capacity of approximately 15 gallons and a working pressure of one thousand pounds gauge pressure. This pressure obviously is far beyond any requirement as far as propylene oxide goes unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet; pressure gauge, manual vent line; charge hole for initial reactants; at least one connection for introducing the alkylene oxide, such as propylene oxide or ethylene oxide, to the bottom of the autoclave; along with suitable devices for both cooling and heating the autoclave, such as a cooling jacket, and preferably, coils in addition thereto, with the jacket so arranged that it is suitable for heating with steam or cooling with water and further equipped with electrical heating devices. Such autoclaves are, of course, in essence small-scale replicas of the usual conventional autoclave used in oxyalkylation procedures. In some instances in exploratory preparations an autoclave having a smaller capacity, for instance, approximately 3½ liters in one case and about 1¾ gallons in another case, was used.

Continuous operation, or substantially continuous operation, was achieved by the use of a separate container to hold the alkylene oxide being employed, particularly propylene oxide. In conjunction with the smaller autoclaves, the container consists essentially of a laboratory bomb having a capacity of about one-half gallon, or somewhat in excess thereof. In some instances a larger bomb was used, to wit, one having a capacity of about one gallon. This bomb was equipped, also, with an inlet for charging, and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer connection for nitrogen for pressuring bomb, etc. The bomb was placed on a scale during use. The connections between the bomb and the autoclave were flexible stainless steel hose or tubing so that continuous weighings could be made without breaking or making any connections. This applies also to the nitrogen line, which was used to pressure the bomb reservoir. To the extent that it was required, any other usual conventional procedure or addition which provided greater safety was used, of course, such as safety glass protective screens, etc.

Attention is directed again to what has been said previously in regard to automatic controls which shut off the propylene oxide in event temperature of reaction passes out of the predetermined range or if pressure in the autoclave passes out of predetermined range.

With this particular arrangement practically all oxypropylations become uniform in that the reaction temperature was held within a few degrees of any selected point, for instance, if 105° C. was selected as the operating temperature the maximum point would be at the most 110° C. or 112° C., and the lower point would be 95° or possibly 98° C. Similarly, the pressure was held at approximately 30 pounds within a 5-pound variation one way or the other, but might drop to practically zero, especially where no solvent such as xylene is employed. The speed of reaction was comparatively slow under such conditions as compared with oxyalkylations at 200° C. Numerous reactions were conducted in which the time varied from one day (24 hours) up to three days (72 hours), for completion of the final member of a series. In some instances the reaction may take place in considerably less time, i. e., 24 hours or less, as far as a partial oxypropylation is concerned. The minimum time recorded was about a 3-hour period in a single step. Reactions indicated as being complete in 10 hours may have been complete in a lesser period of time in light of the automatic equipment employed. This applies also where the reactions were complete in a shorter period of time, for instance, 4 to 5 hours. In the addition of propylene oxide, in the autoclave equipment as far as possible the valves were set so all the propylene oxide if fed continuously would be added at a rate so that the predetermined amount would react within the first 15 hours of the 24-hour period or two-thirds of any shorter period. This meant that if the reaction was interrupted automatically for a period of time for pressure to drop or temperature to drop the predetermined amount of oxide would still be added in most instances well within the predetermined time period. Sometimes where the addition was a comparatively small amount in a 10-hour period there would be an unquestionable speeding up of the reaction, by simply repeating the examples and using 3, 4, or 5 hours instead of 10 hours.

When operating at a comparatively high temperature, for instance, between 150° to 200° C., an unreacted alkylene oxide such as propylene oxide, makes its presence felt in the increase in pressure or the consistency of a higher pressure. However, at a low enough temperature it may happen that the propylene oxide goes in as a liquid. If so, and if it remains unreacted there is, of course, an inherent danger and appropriate steps must be taken to safeguard against this possibility; if need be a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the later stages of reaction, the longer the time required to add a given amount of oxide. One possible explanation is that the molecule, being larger, the opportunity for random reaction is decreased. Inversely, the lower the molecular weight the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature even in large scale operations as much as a week or ten days time may lapse to obtain some of the higher molecular weight derivatives from monohydric or dihydric materials.

In a number of operations the counterbalance scale or dial scale holding the propylene oxide bomb was so set that when the predetermined amount of propylene oxide had passed into the reaction the scale movement through a time operating device was set for either one to two hours so that reaction continued for 1 to 3 hours after the final addition of the last propylene oxide and thereafter the operation was shut down. This particular device is particularly suitable for use on larger equipment than laboratory size autoclaves, to wit, on semi-pilot plant or pilot plant size, as well as on large scale size. This final stirring period is intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel was also automatic insofar that the feed stream was set for a slow continuous run which was shut off in case the pressure passed a predetermined point as previously set out. All the points of design, construction, etc., were conventional including the gauges, check valves and entire equipment. As far as I am aware at least two firms, and possibly three, specialize in autoclave equipment such as I have employed in the laboratory, and are prepared to furnish equipment of this same kind. Similarly pilot plant equipment is available. This point is simply made as a precaution in the direction of safety. Oxyalkylations, particularly involving ethylene oxide, glycide, propylene oxide, etc., should not be conducted except in equipment specifically designed for the purpose.

*Example 1a*

The starting material used was a commercial grade of acetamide. The particular autoclave used in the first step only, i. e., the present step, was one with a capacity of about 1½ to 2 gallons and would conveniently handle approximately 10 to 12 pounds of reaction mass. The speed of the stirrer could be varied from 150 to 350 R. P. M. Approximately 1.09 pounds of acetamide were charged into the autoclave along with .11 pound of caustic soda. The reaction pot was flushed out with nitrogen. The autoclave was sealed in the usual manner and the automatic devices adjusted and set for injecting 9.55 pounds of propylene oxide in approximately 2 hours. The pressure regulator was set for a maximum of 35 pounds per square inch. This meant that the bulk of the reaction could take place, and probably did take place, at a comparatively low pressure. This comparatively low pressure was the result of the fact that considerable catalyst was present and also due to the fact that the acetamide in some ways reacted more vigorously with propylene oxide in the initial stage than one would expect. The reason is probably concerned with the actual structure of the amide which has been noted previously.

The propylene oxide was added comparatively slowly and, more important, the temperature was held at approximately 210° to 220° F. (slightly higher than the boiling point of water). The initial introduction of oxide was not started until the heating devices had raised the temperature to above the boiling point of water. At the completion of the reaction no sample was taken but the entire mass was transferred to a larger autoclave as stated in Example 2a, following.

Example 2a

The entire reaction mass above described, derived from 1.09 pounds of acetamide, 9.55 pounds of propylene oxide and .11 pound of caustic soda, was transferred to a large autoclave having a capacity of about 15 gallons and on the average of about 120 pounds of reaction mass. All devices on the large autoclave were identical with those on the small autoclave and the operation was entirely the same. To the 10.7 pounds of reaction mass identified as Example 1a, preceding, there were added 31 pounds of propylene oxide. No additional catalyst was added. The oxypropylation was conducted in substantially the same manner with regard to temperature as in Example 1a, preceding, but not in regard to pressure, except that the reaction period was rather long due to the slowness of reaction. The time required was 10 hours. Actually the pressure during this operation reached 50 pounds instead of approximately 35 or 37 pounds. This was necessary in order to get the propylene oxide in 10 hours. This slowing up of the reaction has been noted on various occasions where transfer was made from a small autoclave to a large autoclave. At the end of the reaction period part of the reaction mass was withdrawn, more catalyst was added, and the residual mass subjected to further reaction as described in Example 3a, following.

Example 3a

The residual mass of 34.25 pounds was permitted to stay in the autoclave. This represented in part added caustic and corresponded to .89 pound of acetamide, 33.07 pounds of propylene oxide, and .29 pound of caustic soda. 22 pounds of propylene oxide were introduced in the same manner as described in Example 1a. The conditions of temperature and pressure were substantially the same as in Example 1a. It is to be noted that even with the added catalyst the time was as long as in Example 2a, i. e., 10 hours.

Example 4a

Example 3a, preceding, gave derivatives having a theoretical molecular weight of approximately 6500. Following the same procedure the compounds were obtained having a theoretical molecular weight in the neighborhood of 8,000 to 10,000. However, in order to obtain a wider variation between the range of 1,000 to 4,000 a new batch was started in the large autoclave, i. e., the autoclave having a capacity of about 15 gallons. In this instance 10 pounds of acetamide mixed with one pound of caustic soda was reacted with 86.5 pounds of propylene oxide. The temperature and pressure range were substantially the same as in Example 1a, preceding, i. e., 220° to 225° F., and 35 to 37 pounds per square inch. The time required was approximately 6 hours to complete the reaction. As in Example 1a, preceding, part of the reaction mass was withdrawn and the remainder allowed to remain in the autoclave for further oxypropylation as described in Example 5a, immediately following.

Example 5a 62.5 pounds of reaction mass identified as Example 4a, preceding, were subjected to further oxypropylation with 32.25 pounds of propylene oxide. No additional catalyst was added. The conditions of oxypropylation as far as temperature and pressure were concerned, were substantially the same as described in Example 4a, preceding. The time required was 6 hours. Part of the reaction mass was withdrawn and the remainder subjected to further oxypropylation as described in Example 6a immediately following.

Example 6a 52.3 pounds of reaction mass identified as Example 5a, preceding, were permitted to remain in the autoclave and without the addition of any more catalyst 42.5 pounds of propylene oxide were introduced into the autoclave. The conditions, as far as temperature and pressure were concerned, were the same as in Example 4a, preceding. The time period, however, was definitely longer insofar that 10 hours were required. When the oxypropylation was complete part of the reaction mass was withdrawn and part permitted to remain in the autoclave for further oxypropylation as described in Example 7a, immediately following.

Example 7a 51.76 pounds of reaction mass identified as Example 6a, preceding, were permitted to remain in the autoclave and without adding any more catalyst 18 pounds of propylene oxide were introduced. The conditions as far as temperature were concerned were the same as in Example 4a, preceding. The time period was somewhat less than in the preceding example and in this instance was 8 hours. Part of the reaction mass was permitted to stay in the autoclave and the remainder was subjected to further oxypropylation as described in Example 8a, immediately following.

Example 8a 39.6 pounds of reaction mass identified as Example 7a, preceding, were permitted to remain in the autoclave and without the addition of any more catalyst 17.25 pounds of propylene oxide were added. Conditions as far as temperature and pressure were concerned were the same as in Example 4a, preceding. The time required to add the propylene oxide in this instance was 10 hours. Part of the reaction mass was withdrawn and the remainder subjected to further oxypropylation as described in Example 9a, immediately following.

Example 9a 49 pounds of reaction mass identified as Example 8a, preceding, were permitted to remain in the autoclave without addition of any more catalyst. This was subjected to reaction with 16.5 pounds of propylene oxide. The conditions as far as temperature and pressure were concerned were substantially the same as in Example 8a, preceding. However, due to the low concentration of catalyst, or perhaps for some other reason, the time required was unusually long, i. e., 18 hours.

In this particular series of examples the oxypropylation was stopped at this stage. In other series I have continued the oxypropylation so that the theoretical molecular weight varied to somewhat short of 10,000 but the increase in molecular weight by hydroxyl determination was comparatively small, i. e., 3,000 to 4,000.

Incidentally, I have repeated the above examples, using some of the low molal amides, such as propionamide, which are available in reagent quality but not available commercially. No significant difference appeared except that water-insolubility in some of the higher amides having in all instances less than 8 carbon atoms, appeared at approximately 1,000 theoretical molecular weight or less.

What is said herein is presented in tabular form in the table immediately following with some added information as to molecular weight and as to solubility of the reaction product in water, xylene, and kerosene.

tion step was a somewhat viscous fluid with a very slight reddish tinge. This is characteristic of all the products obtained at the various stages above noted and also characteristic of the products obtained from other amides. The products were, of course, slightly alkaline due to the residual caustic soda. The residual basicity due to catalyst would, of course, be the same if sodium methylate had been used.

Speaking of insolubility in water or solubility in kerosene such solubility test can be made simply by shaking small amounts of the materials in a test tube with water, for instance, using 1% to 5% approximately based on the amount of water present.

Needless to say, there is no complete conversion of propylene oxide into the desired hydroxylated compounds. This is indicated by the fact that the theoretical molecular weight based on a statistical average is greater than the molecular weight calculated by usual methods on basis of acetyl or hydroxyl value. Actually, there is no completely satisfactory method for determining molecular weights of these types of compounds with a high degree of accuracy when the molecu-

TABLE 1

| Ex. No. | Composition Before | | | Composition at End | | | | M. W. by Hyd. Determin. | Max. Temp., °F. | Max. Pres., lbs. per sq. in. | Time, Hrs. |
|---|---|---|---|---|---|---|---|---|---|---|---|
| | Amide Amt., lbs. | Oxide Amt., lbs. | Catalyst, lbs. | Theo. Mol. Wt. | Amide Amt., lbs. | Oxide Amt., lbs. | Catalyst, lbs. | | | | |
| 1a | 1.09 | -------- | .11 | -------- | 1.09 | 9.55 | .11 | -------- | 210–220 | 35 | 2 |
| 2a | 1.09 | 9.55 | .11 | 2,200 | 1.09 | 40.55 | .11 | 1,720 | 220–225 | 50 | 10 |
| 3a | 0.89 | 33.07 | .29 | 6,530 | .89 | 55.07 | .29 | 2,280 | 220–225 | 35–37 | 10 |
| 4a | 10.0 | -------- | 1.0 | 570 | 10.0 | 86.5 | 1.0 | 694 | 220–225 | 35–37 | 6 |
| 5a | 6.42 | 55.44 | .64 | 865 | 6.42 | 87.69 | .64 | 932 | 220–225 | 35–37 | 6 |
| 6a | 3.56 | 48.46 | .36 | 1,565 | 3.56 | 90.96 | .36 | 1,532 | 220–225 | 35–37 | 10 |
| 7a | 1.94 | 49.63 | .19 | 2,120 | 1.94 | 67.63 | .19 | 1,802 | 220–225 | 35–37 | 8 |
| 8a | 1.11 | 38.54 | .11 | 3,020 | 1.11 | 55.79 | .11 | 2,084 | 220–225 | 35–37 | 10 |
| 9a | .96 | 47.94 | .10 | 4,020 | .96 | 64.44 | .10 | 2,720 | 240 | 35–37 | 18 |

Reference is made to the hydroxyl value molecular weight in Examples 4a and 5a. Obviously these values are too high. The amount they are off is probably comparatively small, for instance, 10% to 20%. In this instance investigation seemed to indicate that the difficulty was probably due to the decomposition of compound due to presence of acid, either acid used in neutralization of alkaline catalyst or possibly acid due to the hydroxyl or acetyl determination. The difficulty of molecular weight determinations so far as physical methods are concerned will be examined briefly in a subsequent part of this specification. The difficulties involved in a hydroxyl or acetyl determination are well known and do not require comment.

Examples 2a and 3a were insoluble in water but soluble in both xylene and kerosene. Examples 4a and 5a were soluble in water; Examples 6a thru 9a were water-insoluble. Examples 4a and 5a were somewhat dispersible in xylene; Examples 6a thru 9a were soluble in xylene. Examples 4a thru 7a, inclusive, were insoluble in kerosene. Examples 8a and 9a were soluble in kerosene.

My preference is to use derivatives which are water-insoluble and preferably kerosene-soluble. As has been pointed out previously if the size of the acyl radical in the amide increases it results in earlier water-insolubility, for instance, at a molecular weight of approximately 1,000 or modestly less. This, of course, applies within the previously noted restriction, i. e., that there must not be any group having 8 or more carbon atoms present.

The final product at the end of the oxypropylalar weights exceed 2,000. In some instances the acetyl value or hydroxyl value serves as satisfactorily as an index to the molecular weight as any other procedure, subject to the above limitations, and especially in the higher molecular weight range. If any difficulty is encountered in the manufacture of the esters as described in Part 2 the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

PART 2

As previously pointed out the present invention is concerned with acidic esters obtained from the oxypropylated derivatives described in Part 1, immediately preceding, and polycarboxy acids, particularly dicarboxy acids such as adipic acid, phthalic acid, or anhydride, succinic acid, diglycollic acid, sebacic acid, azelaic acid, aconitic acid, maleic acid or anhydride, citraconic acid or anhydride, maleic acid or anhydride adducts as obtained by the Diels-Alder reaction from products such as maleic anhydride, and cyclopentadiene. Such acids should be heat stable so they are not decomposed during esterification. They may contain as many as 36 carbon atoms as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols or other hydroxylated compounds is well known. Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950, to DeGroote and Keiser, and particularly with one more opening to permit the use of a porous spreader if hydrochloric acid gas is to be used as a catalyst. Such device or absorption spreader consists of minute alundum thimbles which are connected to a glass tube. One can add a sulfonic acid such as para-toluene sulfonic acid as a catalyst. There is some objection to this because in some instances there is some evidence that this acid catalyst tends to decompose or rearrange the oxypropylated compounds, and particularly likely to do so if the esterification temperature is too high. In the case of polycarboxy acids such as diglycollic acid, which is strongly acidic there is no need to add any catalyst. The use of hydrochloric gas has one advantage over paratoluene sulfonic acid and that is that at the end of the reaction it can be removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever and to insure complete dryness of the diol as described in the final procedure just preceding Table 2.

The products obtained in Part 1 preceding may contain a basic catalyst. As a general procedure I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage needless to say a second filtration may be required. In any event the neutral or slightly acidic solution of the oxypropylated derivatives described in Part 1 is then diluted further with sufficient xylene decalin, petroleum solvent, or the like, so that one has obtained approximately a 45% solution. To this solution there is added a polycarboxylated reactant as previously described, such as phthalic anhydride, succinic acid or anhydride, diglycollic acid, etc. The mixture is refluxed until esterification is complete as indicated by elimination of water or drop in carboxyl value. Needless to say, if one produces a half-ester from an anhydride such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the sodium sulfate and probably the sodium chloride formed. The clear somewhat viscous straw-colored amber liquid so obtained may contain a small amount of sodium sulfate or sodium chloride, but, in any event, is perfectly acceptable for esterification in the manner described.

It is to be pointed out that the products here described are not polyesters in the sense that there is a plurality of both diol radicals and acid radicals; the product is characterized by having only one diol radical.

In some instances and, in fact, in many instances I have found that in spite of the dehydration methods employed above that a mere trace of water still comes through and that this mere trace of water certainly interferes with the acetyl or hydroxyl value determination, at least when a number of conventional procedures are used and may retard esterification, particularly where there is no sulfonic acid or hydrochloric acid present as a catalyst. Therefore, I have preferred to use the following procedure: I have employed about 200 grams of the diol as described in Part 1, preceding; I have added about 60 grams of benzene, and then refluxed this mixture in the glass resin pot using a phase-separating trap until the benzene carried out all the water present as water of solution or the equivalent. Ordinarily this refluxing temperature is apt to be in the neighborhood of 130° to possibly 150° C. When all this water or moisture has been removed I also withdraw approximately 20 grams or a little less benzene and then add the required amount of the carboxy reactant and also about 150 grams of a high boiling aromatic petroleum solvent. These solvents are sold by various oil refineries and, as far as solvent effect act as if they were almost completely aromatic in character. Typical distillation data in the particular type I have employed and found very satisfactory is the following:

| | |
|---|---|
| I. B. P., 142° C. | 50 ml., 242° C. |
| 5 ml., 200° C. | 55 ml., 244° C. |
| 10 ml., 209° C. | 60 ml., 248° C. |
| 15 ml., 215° C. | 65 ml., 252° C. |
| 20 ml., 216° C. | 70 ml., 252° C. |
| 25 ml., 220° C. | 75 ml., 260° C. |
| 30 ml., 225° C. | 80 ml., 264° C. |
| 35 ml., 230° C. | 85 ml., 270° C. |
| 40 ml., 234° C. | 90 ml., 280° C. |
| 45 ml., 237° C. | 95 ml., 307° C. |

After this material is added, refluxing is continued, and, of course, is at a high temperature, to wit, about 160° to 170° C. If the carboxy reactant is an anhydride needless to say no water of reaction appears; if the carboxy reactant is an acid water of reaction should appear and should be eliminated at the above reaction temperature. If it is not eliminated I simply separate out another 10 to 20 cc. of benzene by means of the phase-separating trap and thus raise the temperature to 180° or 190° C., or even to 200° C., if need be. My preference is not to go above 200° C.

The use of such solvent is extremely satisfactory provided one does not attempt to remove the solvent subsequently except by vacuum distillation and provided there is no objection to a little residue. Actually, when these materials are used for a purpose such as demulsification the solvent might just as well be allowed to remain. If the solvent is to be removed by distillation, and particularly vacuum distillation, then the high boiling aromatic petroleum solvent might well be replaced by some more expensive solvent, such as decalin or an alkylated decalin which has a rather definite or close range boiling point. The removal of the solvent, of course, is purely a conventional procedure and requires no elaboration.

In the appended table Solvent #7-3, which appears in all instances, is a mixture of 7 volumes of the aromatic petroleum solvent previously described and 3 volumes of benzene. This was used, or a similar mixture, in the manner previously described. In a large number of similar examples decalin has been used but it is my preference to use the above mentioned mixture and particularly with the preliminary step of removing all the water. If one does not intend to remove the solvent my preference is to use the petroleum solvent-benzene mixture although obviously any of the other mixtures, such as decalin and xylene, can be employed.

The data included in the subsequent tables, i. e., Tables 2 and 3, are self-explanatory, and very complete and it is believed no further elaboration is necessary.

TABLE 3

| Ex. No. of Acid Ester | Solvent | Amt. Solvent (grs.) | Esterification Temp., °C. | Time of Esterification (hrs.) | Water Out (cc.) |
|---|---|---|---|---|---|
| 1b | #7-3 | | 135 | 1½ | 7.0 |
| 2b | #7-3 | 237 | 161 | 2 | None |
| 3b | #7-3 | 223 | 147 | 2 | 0.2 |
| 4b | #7-3 | 241 | 195 | 4½ | 4.0 |
| 5b | #7-3 | 234 | 167 | 1 | None |
| 6b | #7-3 | 236 | 152 | 3½ | 4.4 |
| 7b | #7-3 | 224 | 148 | 3 | 3.2 |
| 8b | #7-3 | 232 | 153 | 3¼ | 0.4 |
| 9b | #7-3 | 223 | 151 | 3½ | 0.3 |
| 10b | #7-3 | 231 | 157 | 3¾ | 3.3 |
| 11b | #7-3 | 224 | 164 | 1½ | None |
| 12b | #7-3 | 278 | 157 | 5 | 12.5 |
| 13b | #7-3 | 266 | 168 | 6 | 1.0 |
| 14b | #7-3 | 308 | 168 | 7 | 1.1 |
| 15b | #7-3 | 279 | 183 | 4½ | 1.0 |
| 16b | #7-3 | 322 | 148 | 6 | 12.2 |
| 17b | #7-3 | 267 | 148 | 5½ | 9.0 |
| 18b | #7-3 | 246 | 142 | 1½ | 27.5 |
| 19b | #7-3 | 248 | 152 | 1½ | .2 |
| 20b | #7-3 | 267 | 150 | 2½ | |
| 21b | #7-3 | 251 | 160 | 2 | |
| 22b | #7-3 | 270 | 140 | ¾ | 7.5 |
| 23b | #7-3 | 322 | 155 | 5 | 5.0 |
| 24b | #7-3 | 223 | 143 | 1 | 14.5 |
| 25b | #7-3 | 240 | 152 | 2 | |
| 26b | #7-3 | 245 | 160 | 2⅜ | |
| 27b | #7-3 | 227 | 153 | 2 | |
| 28b | #7-3 | 239 | 178 | 6 | 4.0 |
| 29b | #7-3 | 234 | 158 | 4 | 4.3 |
| 30b | #7-3 | 218 | 162 | ½ | 14.0 |
| 31b | #7-3 | 227 | 155 | 1½ | |
| 32b | #7-3 | 254 | 153 | 2½ | |
| 33b | #7-3 | 227 | 155 | 1 | |
| 34b | #7-3 | 237 | 160 | 3½ | 4.0 |
| 35b | #7-3 | 225 | 155 | 6 | 3.6 |
| 36b | #7-3 | 219 | 141 | 1¼ | 10.5 |
| 37b | #7-3 | 221 | 150 | 1¼ | |
| 38b | #7-3 | 231 | 161 | 3 | |
| 39b | #7-3 | 224 | 144 | 2 | |
| 40b | #7-3 | 234 | 153 | 5 | 3.6 |
| 41b | #7-3 | 224 | 180 | 3 | 2.9 |
| 42b | #7-3 | 212 | 143 | 1½ | 8.3 |
| 43b | #7-3 | 214 | 152 | 1½ | |
| 44b | #7-3 | 221 | 150 | 3 | |
| 45b | #7-3 | 218 | 157 | 1½ | |
| 46b | #7-3 | 221 | 156 | 21¾ | 2.6 |

TABLE 2

| Ex. No. of Acid Ester | Ex. No. of Oxy. Cmpd. | Theo. M. W. of H. C. | Theo. Hydroxyl V. of H. C. | Actual Hydroxyl Value | Mol. Wt. Based on Actual H. V. | Amt. of Hyd. Cmpd. (grs.) | Polycarboxy Reactant | Amt. of Polycarboxy Reactant (grs.) |
|---|---|---|---|---|---|---|---|---|
| 1b | 2a | 2,200 | 51.1 | 65.3 | 1,720 | 202 | Diglycollic Acid | 31.6 |
| 2b | 2a | 2,200 | 51.1 | 65.3 | 1,720 | 202 | Phthalic Anhydride | 35.0 |
| 3b | 2a | 2,200 | 51.1 | 65.3 | 1,720 | 200 | Maleic Anhydride | 22.8 |
| 4b | 2a | 2,200 | 51.1 | 65.3 | 1,720 | 204 | Aconitic Acid | 41.4 |
| 5b | 2a | 2,200 | 51.1 | 65.3 | 1,720 | 207 | Citraconic Anhydride | 26.8 |
| 6b | 2a | 2,200 | 51.1 | 65.3 | 1,720 | 208 | Diglycollic Acid | 32.4 |
| 7b | 3a | 6,530 | 18.6 | 49.2 | 2,280 | 203 | do | 23.8 |
| 8b | 3a | 6,530 | 18.6 | 49.2 | 2,280 | 205 | Phthalic Anhydride | 26.6 |
| 9b | 3a | 6,530 | 18.6 | 49.2 | 2,280 | 203 | Maleic Anhydride | 17.5 |
| 10b | 3a | 6,530 | 18.6 | 49.2 | 2,280 | 203 | Aconitic Acid | 31.0 |
| 11b | 3a | 6,530 | 18.6 | 49.2 | 2,280 | 204 | Citraconic Anhydride | 20.0 |
| 12b | 4a | 570 | 197 | 162 | 694 | 198 | Diglycollic Acid | 93.4 |
| 13b | 4a | 570 | 197 | 162 | 694 | 198 | Maleic Anhydride | 68.1 |
| 14b | 4a | 570 | 197 | 162 | 694 | 203 | Phthalic Anhydride | 105.3 |
| 15b | 4a | 570 | 197 | 162 | 694 | 200 | Citraconic Anhydride | 78.6 |
| 16b | 4a | 570 | 197 | 162 | 694 | 208 | Aconitic Acid | 127.0 |
| 17b | 5a | 865 | 130 | 120.5 | 932 | 211 | Diglycollic Acid | 65.3 |
| 18b | 5a | 865 | 130 | 120.5 | 932 | 211 | Oxalic Acid | 61.4 |
| 19b | 5a | 865 | 130 | 120.5 | 932 | 202 | Maleic Anhyd | 45.8 |
| 20b | 5a | 865 | 130 | 120.5 | 932 | 199 | Phthalic Anhyd | 68.0 |
| 21b | 5a | 865 | 130 | 120.5 | 932 | 199 | Citraconic Anhydride | 51.5 |
| 22b | 5a | 865 | 130 | 120.5 | 932 | 198 | Aconitic Acid | 79.8 |
| 23b | 6a | 1,565 | 71.6 | 73.2 | 1,532 | 202 | Diglycollic Acid | 35.4 |
| 24b | 6a | 1,565 | 71.6 | 73.2 | 1,532 | 203 | Oxalic Acid | 33.5 |
| 25b | 6a | 1,565 | 71.6 | 73.2 | 1,532 | 213 | Maleic Anhydride | 27.2 |
| 26b | 6a | 1,565 | 71.6 | 73.2 | 1,532 | 205 | Phthalic Anhydride | 39.5 |
| 27b | 6a | 1,565 | 71.6 | 73.2 | 1,532 | 198 | Citraconic Anhydride | 28.9 |
| 28b | 6a | 1,565 | 71.6 | 73.2 | 1,532 | 200 | Aconitic Acid | 43.6 |
| 29b | 7a | 2,120 | 53.0 | 62.4 | 1,802 | 207 | Diglycollic Acid | 30.8 |
| 30b | 7a | 2,120 | 53.0 | 62.4 | 1,802 | 202 | Oxalic Acid | 28.2 |
| 31b | 7a | 2,120 | 53.0 | 62.4 | 1,802 | 204 | Maleic Anhydride | 22.2 |
| 32b | 7a | 2,120 | 53.0 | 62.4 | 1,802 | 218 | Phthalic Anhydride | 35.8 |
| 33b | 7a | 2,120 | 53.0 | 62.4 | 1,802 | 202 | Citraconic Anhydride | 25.1 |
| 34b | 7a | 2,120 | 53.0 | 62.4 | 1,802 | 202 | Aconitic Acid | 39.0 |
| 35b | 8a | 3,020 | 37.2 | 39.5 | 2,084 | 203 | Diglycollic Acid | 26.0 |
| 36b | 8a | 3,020 | 37.2 | 39.5 | 2,084 | 204 | Oxalic Acid | 24.6 |
| 37b | 8a | 3,020 | 37.2 | 39.5 | 2,084 | 202 | Maleic Anhydride | 19.1 |
| 38b | 8a | 3,020 | 37.2 | 39.5 | 2,084 | 202 | Phthalic Anhydride | 28.9 |
| 39b | 8a | 3,020 | 37.2 | 39.5 | 2,084 | 202 | Citraconic Anhydride | 21.6 |
| 40b | 8a | 3,020 | 37.2 | 39.5 | 2,084 | 206 | Aconitic Anhydride | 34.2 |
| 41b | 9a | 4,020 | 28 | 41.4 | 2,720 | 206 | Diglycollic Acid | 20.3 |
| 42b | 9a | 4,020 | 28 | 41.4 | 2,720 | 201 | Oxalic Acid | 18.6 |
| 43b | 9a | 4,020 | 28 | 41.4 | 2,720 | 200 | Maleic Anhydride | 14.3 |
| 44b | 9a | 4,020 | 28 | 41.4 | 2,720 | 199 | Phthalic Anhydride | 21.6 |
| 45b | 9a | 4,020 | 28 | 41.4 | 2,720 | 201 | Citraconic Anhydride | 16.6 |
| 46b | 9a | 4,020 | 28 | 41.4 | 2,720 | 199 | Aconitic Acid | 25.4 |

The procedure for manufacturing the esters has been illustrated by preceding examples. If for any reason reaction does not take place in a manner that is acceptable, attention should be directed to the following details: (a) Recheck the hydroxyl or acetyl value of the oxypropylated products of the kind specified and use a stoichiometrically equivalent amount of acid; (b) if the reaction does not proceed with reasonable speed either raise the temperature indicated or else extend the period of time up to 12 or 16 hours if need be; (c) if necessary, use ½% of paratoluene sulfonic acid or some other acid as a catalyst; (d) if the esterification does not produce a clear product a check should be made to see if an inorganic salt such as sodium chloride or sodium sulfate is not precipitating out. Such salt should be eliminated, at least for exploration experimentation, and can be removed by filtering. Everything else being equal as the size of the molecule increases and the reactive hydroxyl radical represents a smaller fraction of the entire molecule more difficulty is involved in obtaining complete esterification.

Even under the most carefully controlled conditions of oxypropylation involving comparatively low temperatures and long time of reaction there are formed certain compounds whose compositions are still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances an attempt to react the stoichiometric amount of a polycarboxy acid with the oxypropylated derivative results in an excess of the carboxylated reactant for the reason that apparently under conditions of reaction less reactive hydroxyl radicals are present than indicated by the hydroxyl value. Under such circumstances there is simply a residue of the carboxylic reactant which can be removed by filtration or, if desired, the esterification procedure can be repeated using an appropriately reduced ratio of carboxylic reactant.

Even the determination of the hydroxyl value by conventional procedure leaves much to be desired due either to the cogeneric materials previously referred to, or for that matter, the presence of any inorganic salts or propylene oxide. Obviously this oxide should be eliminated.

The solvent employed, if any, can be removed from the finished ester by distillation and particularly vacuum distillation. The final products or liquids are generally very pale reddish amber to a moderately reddish amber in color, and show moderate viscosity. They can be bleached with bleaching clays, filtering chars, and the like. However, for the purpose of demulsification or the like color is not a factor and decolorization is not justified.

In the above instances I have permitted the solvents to remain present in the final reaction mass. In other instances I have followed the same procedure using decalin or a mixture of decalin or benzene in the same manner and ultimately removed all the solvents by vacuum distillation. Appearance of the final products are much the same as the oxypropylated amides before esterification and in some instances were somewhat darker in color and had a more reddish cast and were perhaps somewhat more viscous. In some instances the products appear to be lighter colored than the oxypropylated amides from which they were obtained.

PART 3

Previous reference has been made to the fact that diols (nitrogen-free compounds) such as polypropylene glycol of approximately 2,000 molecular weight, for example, have been esterified with dicarboxy acids and employed as demulsifying agents. The herein described compounds are different from such diols although both, it is true, are high molecular weight dihydroxylated compounds. The instant compounds have present a nitrogen atom and are possibly susceptible to certain changes in structure which are not present in an ordinary diol. It seems reasonable to assume that the orientation of such molecules is effected by the presence of such particular structure insofar that presumably it would lead to association by hydrogen bonding or some other effect.

Regardless of what the difference may be the fact still remains that the compounds of the kind herein described may be, and frequently are, 10%, 15% or 20% better on a quantitative basis than the simpler compound previously described, and demulsifying faster and give cleaner oil in many instances. The method of making such comparative tests has been described in a booklet entitled "Treating Oil Field Emulsions," used in the Vocational Training Course, Petroleum Industry Series, of the American Petroleum Institute.

It may be well to emphasize also the fact that oxypropylation does not produce a single compounds but a cogeneric mixture. The factor involved is the same as appears if one were oxypropylating a monohydric alcohol or a glycol. Momentarily, one may consider the structure of a polypropylene glycol, such as polyproylene glycol of 2000 molecular weight. Propylene glycol has a primary alcohol radical and a secondary alcohol radical. In this sense the building unit which forms polypropylene glycols is not symmetrical. Obviously, then, polypropylene glycols can be obtained, at least theoretically, in which two secondary alcohol groups are united or a secondary alcohol group is united to a primary alcohol group, etherization being involved, of course, in each instance.

Usually no effort is made to differentiate between oxypropylation taking place, for example, at the primary alcohol unit radical or the secondary alcohol radical. Actually, when such products are obtained, such as a high molal polypropylene glycol or the products obtained in the manner herein described one does not obtain a single derivative such as $HO(RO)_nH$ in which $n$ has one and only one value, for instance, 14, 15 or 16, or the like. Rather, one obtains a cogeneric mixture of closely related or touching homologues. These materials invariably have high molecular weights and cannot be separated from one another by any known procedure without decomposition. The properties of such mixture represent the contribution of the various individual members of the mixture. On a statistical basis, of course, $n$ can be appropriately specified. For practical purposes one need only consider the oxypropylation of a monohydric alcohol because in essence this is substantially the mechanism involved. Even in such instances where one is concerned with a monohydric reactant one cannot draw a single formula and say that by following such procedure one can readily obtain 80% or 90% or 100% of such compound. However, in the case of at least monohydric initial reactants one can readily draw the formulas of a large number of compounds which appear in some of the probable mixtures or can be prepared as components and mixtures which are manufactured conventionally.

Simply by way of illustrating reference is made to the copending application of DeGroote, Wirtel and Pettingill, Serial No. 109,791, filed August 11, 1949 (now Patent 2,549,434, April 17, 1951).

However, momentarily referring again to a monohydric initial reactant it is obvious that if one selects any such simple hydroxylated compound and subjects such compound to oxyalkylation, such as oxyethylation, or oxypropylation, it becomes obvious that one is really producing a polymer of the alkylene oxide except for the terminal group. This is particularly true where the amount of oxide added is comparatively large, for instance, 10, 20, 30, 40, or 50 units. If such compound is subjected to oxyethylation so as to introduce 30 units of ethylene oxide, it is well known that one does not obtain a single constituent which, for the sake of convenience, may be indicated as $RO(C_2H_4O)_{30}H$. Instead, one obtains a cogeneric mixture of closely related homologues, in which the formula may be shown as the following, $RO(C_2H_4O)_nH$, where $n$, as far as the statistical average goes, is 30, but the individual members present in significant amount may vary from instances where $n$ has a value of 25, and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental Principles of Condensation Polymerization," by Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description, or else consider the value of $n$, in formulas such as those which have appeared previously and which appear in the claims, as representing both individual constituents in which $n$ has a single definite value, and also with the understanding that $n$ represents the average statistical value based on the assumption of completeness of reaction.

This may be illustrated as follows: Assume that in any particular example the molal ratio of the propylene oxide to acetamide or other specified amide of a low molal carboxy acid is 30 to 1. Actually, one obtains products in which $n$ probably varies from 10 to 20, perhaps even further. The average value, however, is 15, assuming, as previously stated, that the reaction is complete. The product described by the formula is best described also in terms of method of manufacture.

PART 4

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such condensation. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and reintroduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation.

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of the product of Example 7b with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier.

PART 5

Previous reference has been made to other oxyalkylating agents other than propylene oxide, such as ethylene oxide. Obviously variants can be prepared which do not depart from what is said herein but do produce modifications. Acetamide or other suitable amide of a low molal monocarboxy acid as described can be reacted with ethylene oxide in modest amounts and then subjected to oxypropylation provided that the resultant derivative is (a) water-insoluble, (b) kerosene-soluble, and (c) has present 15 to 80 alkylene oxide radicals. Needless to say, in order to have water-insolubility and kerosene-solubility the large majority must be propylene oxide. Other variants suggest themselves as, for example, replacing propylene oxide by butylene oxide.

More specifically, one mole of acetamide can be treated with 2, 4 or 6 moles of ethylene oxide and then treated with propylene oxide so as to produce a water-insoluble, kerosene-soluble, oxyalkylated product in which there are present 15 to 80 oxide radicals as previously specified. Similarly the propylene oxide can be added first and then the ethylene oxide, or random oxyalkylation can be employed using a mixture of the two oxides. The compounds so obtained are readily esterified in the same manner as described in Part 2, preceding. Incidentally, the diols or the hydroxylated compounds obtained by oxypropylation described in Part 1 or the modifications described therein can be treated with various reactants such as glycide, epichlorohydrin, dimethyl sulfate, sulfuric acid, maleic anhydride, ethylene imine, etc. If treated with epichlorohydrin or monochloracetic acid the resultant product can be further reacted with a tertiary amine such as pyridine, or the like, to give quaternary ammonium compounds. If treated with maleic anhydride to give a total ester the resultant can be treated with sodium bisulfite to yield a sulfosuccinate. Sulfo groups can be introduced also by means of a sulfating agent as previously suggested, or by treating the chloroacetic acid resultant with sodium sulfite.

I have found that if such hydroxylated compound or compounds are reacted further so as to produce entirely new derivatives, such new derivatives have the properties of the original hydroxylated compound insofar that they are effective and valuable demulsifying agents for resolution of water-in-oil emulsions as found in the petroleum industry, as break inducers in doctor treatment of sour crude, etc.

Having thus described my invention what I claim as new and desire to secure by Letters Patent, is:

1. A process for breaking petroleum emulsions of the water-in-oil type characterized by subjecting the emulsion to the action of a demulsifier including hydrophile synthetic products; said hydrophile synthetic products being a cogeneric mixture selected from the class consisting of acidic fractional esters and acidic amido derivatives obtained by reaction between (A) a polycarboxy acid of the structure

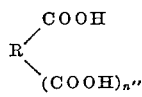

in which R is the radical of a polycarboxy acid and $n''$ is a whole number not over 2; and (B) a compound having 2 reactive hydrogen atoms obtained by the oxypropylation of an amide and having the formula

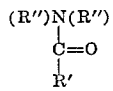

in which R'CO is the acyl radical of a monocarboxy acid having less than 8 carbon atoms in any single group, and R'' is selected from the class consisting of hydrogen atoms and monovalent radical $(C_3H_6O)_{n'''}H$ in which $n'''$ is a whole number not greater than 80; said compound

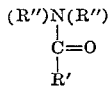

being water-insoluble; with the final proviso that the ratio of (A) to (B) be 2 moles of (A) for one mole of (B).

2. A process for breaking petroleum emulsions of the water-in-oil type characterized by subjecting the emulsion to the action of a demulsifier including hydrophile synthetic products; said hydrophile synthetic products being a cogeneric mixture selected from the class consisting of acidic fractional esters and acidic amido derivatives obtained by reaction between (A) a polycarboxy acid of the structure

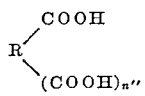

in which R is the radical of a polycarboxy acid and $n''$ is a whole number not over 2; and (B) a compound having 2 reactive hydrogen atoms obtained by the oxypropylation of an amide and having the formula

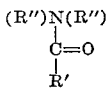

in which R'CO is the acyl radical of a monocarboxy acid having less than 8 carbon atoms in any single group, and R'' is selected from the class consisting of hydrogen atoms and a monovalent radical $(C_3H_6O)_{n'''}H$ in which $n'''$ is a whole number not greater than 80; said compound

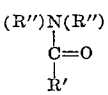

being water-insoluble and kerosene-soluble; with the final proviso that the ratio of (A) to (B) be 2 moles of (A) for one mole of (B).

3. A process for breaking petroleum emulsions of the water-in-oil type characterized by subjecting the emulsion to the action of a demulsifier including hydrophile synthetic products; said hydrophile synthetic products being characterized by the formula

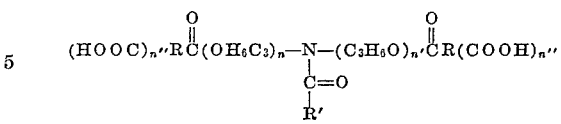

in which R'CO is the acyl radical of a monocarboxy acid having less than 8 carbon atoms in any single group; and $n$ and $n'$ are whole numbers with the proviso that $n$ plus $n'$ equals a sum varying from 15 to 80; $n''$ is a whole number not over 2 and R is the radical of the polycarboxy acid

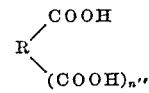

and with the further proviso that the parent dihydroxy compound prior to esterification be water-insoluble and kerosene-soluble.

4. A process for breaking petroleum emulsions of the water-in-oil type characterized by subjecting the emulsion to the action of a demulsifier including hydrophile synthetic products; said hydrophile synthetic products being characterized by the formula

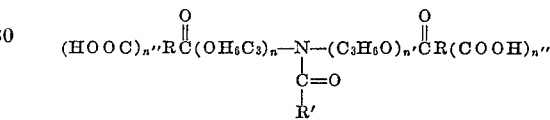

in which R'CO is the acyl radical of a monocarboxy acid having less than 8 carbon atoms in any single group; and $n$ and $n'$ are whole numbers with the proviso that $n$ plus $n'$ equals a sum varying from 15 to 80; $n''$ is a whole number not over 2 and R is the radical of the polycarboxy acid

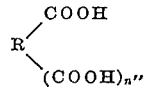

free from any radicals having more than 8 uninterrupted carbon atoms in a single group; and with the further proviso that the parent dihydroxy compound prior to esterification be water-insoluble and kerosene-soluble.

5. A process for breaking petroleum emulsions of the water-in-oil type characterized by subjecting the emulsion to the action of a demulsifier including hydrophile synthetic products; said hydrophile synthetic products being characterized by the formula

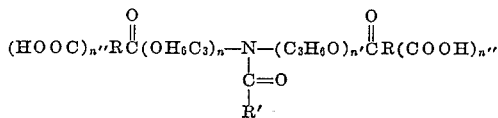

in which R'CO is the acyl radical of a monocarboxy acid having less than 8 carbon atoms in any single group; and $n$ and $n'$ are whole numbers with the proviso that $n$ plus $n'$ equals a sum varying from 15 to 80; $n''$ is a whole number not over 2 and R is the radical of the polycarboxy acid

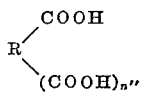

free from any radicals having more than 8 uninterrupted carbon atoms in a single group; and with the further proviso that the parent dihydroxy compound prior to esterification be water-insoluble and kerosene-soluble, and be within the molecular weight range of 1,000 to 6,000 based on hydroxyl value.

6. A process for breaking petroleum emulsions of the water-in-oil type characterized by subjecting the emulsion to the action of a demulsifier including hydrophile synthetic products; said hydrophile synthetic products being characterized by the formula

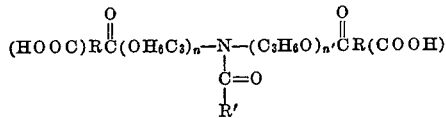

in which R'CO is the acyl radical of a monocarboxy acid having less than 8 carbon atoms in any single group; and $n$ and $n'$ are whole numbers with the proviso that $n$ plus $n'$ equals a sum varying from 15 to 80; and R is the radical of the dicarboxy acid

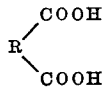

having not more than 8 carbon atoms; and with the further proviso that the parent dihydroxy compound prior to esterification be water-insoluble and kerosene-soluble, and be within the molecular weight range of 1,000 to 6,000 based on hydroxyl value.

7. The process of claim 6 wherein the dicarboxy acid is phthalic acid.

8. The process of claim 6 wherein the dicarboxy acid is maleic acid.

9. The process of claim 6 wherein the dicarboxy acid is oxalic acid.

10. The process of claim 6 wherein the dicarboxy acid is citraconic acid.

11. The process of claim 6 wherein the dicarboxy acid is diglycollic acid.

MELVIN DE GROOTE.

REFERENCES CITED

The following references are of record in the file of this patent:

UNITED STATES PATENTS

| Number | Name | Date |
|---|---|---|
| 2,390,082 | De Groote | Dec. 4, 1945 |
| 2,562,878 | Blair | Aug. 7, 1951 |